(12) United States Patent
Kang et al.

(10) Patent No.: US 12,397,611 B2
(45) Date of Patent: Aug. 26, 2025

(54) APPARATUS AND SYSTEM FOR SHARING AIR CONDITIONING AIR FOR MOBILITY VEHICLE

(71) Applicants: Hyundai Motor Company, Seoul (KR); Kia Corporation, Seoul (KR)

(72) Inventors: Su Yeon Kang, Seoul (KR); Gee Young Shin, Suwon-Si (KR); Dae Hee Lee, Incheon (KR); Myung Hoe Kim, Seoul (KR); Dong Ho Kwon, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 578 days.

(21) Appl. No.: 17/869,577

(22) Filed: Jul. 20, 2022

(65) Prior Publication Data

US 2023/0138139 A1  May 4, 2023

(30) Foreign Application Priority Data

Nov. 2, 2021 (KR) .......................... 10-2021-0148779

(51) Int. Cl.
*B60H 1/00* (2006.01)
*B60P 3/36* (2006.01)

(52) U.S. Cl.
CPC ..... *B60H 1/00407* (2013.01); *B60H 1/00028* (2013.01); *B60P 3/36* (2013.01); *B60H 2001/00085* (2013.01)

(58) Field of Classification Search
CPC ...... B60P 3/36; B60P 3/38; B60P 3/39; B60P 3/32; B60H 1/00407; B60H 1/00564
See application file for complete search history.

(56) References Cited

U.S. PATENT DOCUMENTS 4,462,631 A * 7/1984 Lange ...................... B60P 3/38
296/26.02

FOREIGN PATENT DOCUMENTS

KR  10-2014-0121519  10/2014

OTHER PUBLICATIONS https://www.campstreamgear.com/product/campstream-essentials.*

* cited by examiner

*Primary Examiner* — Ko-Wei Lin
(74) *Attorney, Agent, or Firm* — MORGAN, LEWIS & BOCKIUS LLP

(57) ABSTRACT

In an exemplary embodiment of the present disclosure, a mobility vehicle and a tent shares air-conditioned air through a duct so that the air-conditioned air produced in the mobility vehicle circulates through the duct and a temperature in an internal space of the tent is adjusted. Furthermore, in an apparatus and system for sharing air-conditioned air for a mobility vehicle, energy efficiency is improved as a loss of the air-conditioned air is minimized at the time of transmitting the air-conditioned air from the mobility vehicle to the tent.

20 Claims, 4 Drawing Sheets

AIR DISCHARGE PORT
(DEFROST)

HOOK

APPARATUS AND SYSTEM FOR SHARING AIR CONDITIONING AIR FOR MOBILITY VEHICLE

CROSS REFERENCE TO RELATED APPLICATION

The present application claims priority to Korean Patent Application No. 10-2021-0148779, filed Nov. 2, 2021, the entire contents of which is incorporated herein for all purposes by this reference.

BACKGROUND OF THE PRESENT DISCLOSURE

Field of the Present Disclosure

The present disclosure relates to an apparatus and system for sharing air-conditioned air for a mobility vehicle, which allow air-conditioned air produced by a mobility vehicle to be shared with a tent during outdoor camping so that a temperature in an internal space of the tent is adjusted by the air conditioning air, ensuring pleasant use of the tent.

Description of Related Art

Recently, there have been developed mobility vehicles using electricity stored in batteries as well as mobility vehicles that travel using fossil fuel such as gasoline, diesel, gas, and the like.

Furthermore, technologies are being developed so that the mobility vehicle, which operates using electricity, not only performs a traveling function, but also shares electricity with other devices.

Therefore, a user may perform leisure activities by use of the mobility vehicle. To perform the leisure activities using the mobility vehicle, the user connects a separate camping vehicle or trailer to the mobility vehicle or simply accommodates a tent in the mobility vehicle and then installs the tent outside the interior of the mobility vehicle.

In the instant case, the camping vehicle or trailer may implement various functions including an air conditioning function, but utilization of the camping vehicle or trailer deteriorates because the camping vehicle or trailer has a large volume and is limited in moving.

Therefore, the user tends to accommodate a tent in the mobility vehicle, moves to a location, install the tent at the location, and then enjoy the leisure.

However, because the tent is provided separately from the mobility vehicle and has no separate air conditioning facility, it is difficult to ensure a pleasant internal of the tent.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and system for sharing air-conditioned air for a mobility vehicle, which allow air-conditioned air produced by a mobility vehicle to be shared with a tent during outdoor camping so that a temperature in an internal space of the tent is adjusted by the air conditioning air, ensuring pleasant use of the tent.

Various aspects of the present disclosure are directed to providing an apparatus of sharing air-conditioned air for a mobility vehicle, the apparatus including: a mobility vehicle including an air conditioner configured to provide the air-conditioned air to an interior of the mobility vehicle; a shelter provided outside the interior of the mobility vehicle and including an internal space in the shelter; and a duct configured for extending to allow the interior of the mobility vehicle and the internal space of the shelter to fluidically communicate with each other, the duct being configured to allow the air-conditioned air provided by the air conditioner to be shared with the internal space of the shelter.

The mobility vehicle may have an air intake port through which internal air of the mobility vehicle is introduced, and an air discharge port through which the air-conditioned air provided by the air conditioner is discharged, the duct may include an inlet duct and an outlet duct, the inlet duct may be connected to the air discharge port to allow the air-conditioned air to flow to the shelter, and the outlet duct may be connected to the air intake port to allow air in the shelter to circulate through the mobility vehicle.

One end portion of the inlet duct may be detachably connected to the air discharge port of the mobility vehicle, the other end portion of the inlet duct may be penetratively connected to the shelter, one end portion of the outlet duct may be penetratively connected to the shelter, and the other end portion of the outlet duct may be detachably connected to the air intake port of the mobility vehicle.

The inlet duct may be formed to surround the air discharge port and mounted to cover the air discharge port.

When the air-conditioned air is provided through a front air conditioner, the inlet duct may be coupled to a defrosting discharge port among the air discharge ports.

When the air-conditioned air is provided through a rear air conditioner, the inlet duct may be connected to the air discharge port connected to the rear air conditioner, and the outlet duct may be connected to an air inlet port connected to the rear air conditioner.

The apparatus may further include a duct bracket detachably mounted on the mobility vehicle and configured to fix a position of the duct.

The duct bracket may be detachably mounted on an opening/closing unit including a door glass or a roof of the mobility vehicle, and the duct may pass through the duct bracket to allow the interior of the mobility vehicle and the internal space of the shelter to fluidically communicate with each other through the duct.

The duct bracket may be formed to match a shape of a portion of the door glass or the roof forming the opening/closing unit, and the duct bracket may be mounted by being pressed against the door glass or the roof when the opening/closing unit is closed.

Various aspects of the present disclosure are directed to providing a system for sharing air-conditioned air for a mobility vehicle, the system including: a mobility vehicle including an air conditioner configured to provide the air-conditioned air to an interior of the mobility vehicle, the air conditioner including an air intake port through which internal air of the mobility vehicle is introduced, and an air discharge port through which the air-conditioned air provided by the air conditioner is discharged; a shelter provided outside the interior of the mobility vehicle and including an internal space in the shelter; a duct configured for extending to allow the interior of the mobility vehicle and the internal space of the shelter to fluidically communicate with each other, the duct being configured to allow the air-conditioned air provided by the air conditioner to be shared with the internal space of the shelter; and a control unit configured to control the mobility vehicle including the air conditioner, include a camping mode in addition to an air conditioning mode, and control the air conditioner according to the camping mode when the camping mode is selected.

When the camping mode is selected, the control unit may perform a recirculation mode in which outside air is blocked out of the mobility vehicle and internal air circulates in the mobility vehicle.

When the camping mode is selected, the control unit may blow the air-conditioned air at a maximum flow rate.

The duct may include an inlet duct and an outlet duct, the inlet duct may be connected to the air discharge port to allow the air-conditioned air to flow to the shelter, the outlet duct may be connected to the air intake port to allow air in the shelter to circulate through the mobility vehicle, and when the camping mode is selected, the control unit may perform control to open the air discharge port connected to the inlet duct and close a remaining air discharge port.

The control unit may receive information as to whether an occupant is present in the interior of the mobility vehicle, and when the occupant is present in the interior of the mobility vehicle, the control unit may perform control to open the air discharge port corresponding to a seat in which the occupant is accommodated.

When the camping mode is selected, the control unit may check, from a user, whether the inlet duct and the outlet duct are mounted, and when the control unit concludes, from the user, that the inlet duct and the outlet duct are mounted, the control unit may perform control of the air conditioner according to the camping mode.

The mobility vehicle may further include a duct bracket detachably mounted on an opening/closing unit including a door glass or a roof of the mobility vehicle, the duct bracket may be configured to fix the inlet duct and the outlet duct as the inlet duct and the outlet duct penetrate the duct bracket, and the control unit may check whether the duct bracket is mounted on the opening/closing unit when the camping mode is selected.

When an opening amount of the opening/closing unit is at a predetermined level, the control unit may determine that the duct bracket is mounted, and when the control unit determines that the duct bracket is mounted, the control unit may perform control of the air conditioner according to the camping mode.

When the camping mode is selected, the control unit may perform control of the air conditioner not to perform a function of removing moisture.

When the camping mode is selected, the control unit may receive information in a state of charge (SOC) value of a battery of the mobility vehicle and check a charging station closest to a current position of the mobility vehicle or a minimum amount of electricity of the battery which is to be consumed while the mobility vehicle gets a preset charging station, and when the state of charge of the battery reaches the minimum amount of electricity of the battery, the control unit may not operate the air conditioner.

The apparatus and system for sharing air-conditioned air for the mobility vehicle structured as described above allow the mobility vehicle and the shelter to share the air-conditioned air through the duct so that the air-conditioned air produced in the mobility vehicle circulates through the duct and the temperature in the internal space of the shelter is adjusted.

Furthermore, energy efficiency is improved as a loss of the air-conditioned air is minimized at the time of transmitting the air-conditioned air from the mobility vehicle to the shelter.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
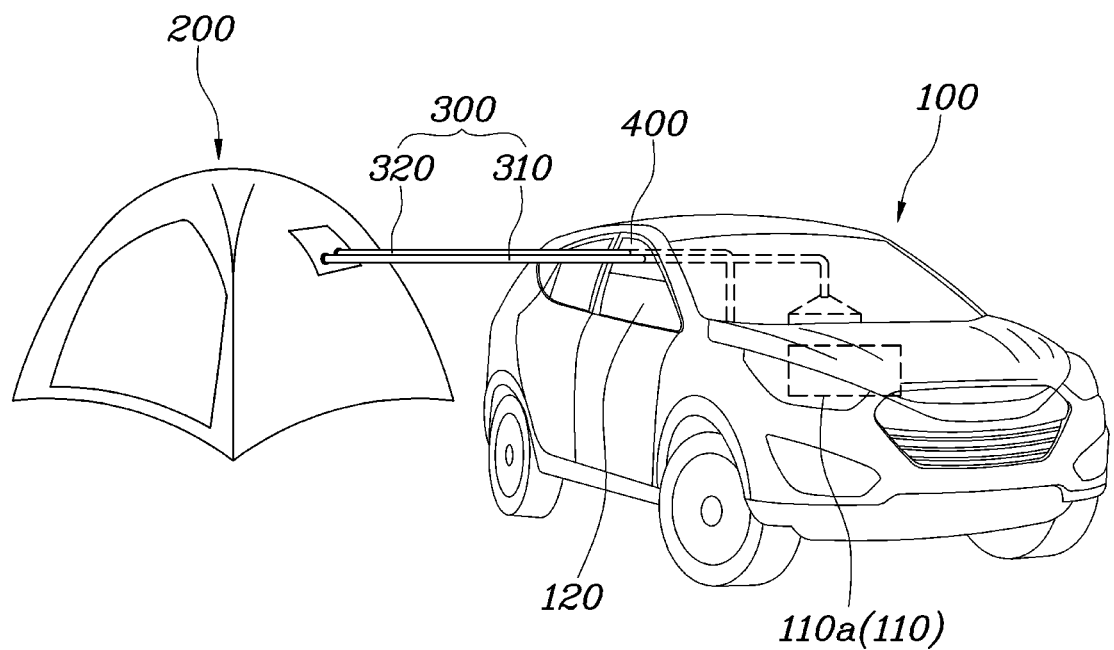
FIG. 1 is a view exemplarily illustrating an apparatus of sharing air-conditioned air for a mobility vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an apparatus and system for sharing air-conditioned air for a mobility vehicle according to various exemplary embodiments of the present disclosure will be described with reference to the accompanying drawings.

Figure 2:
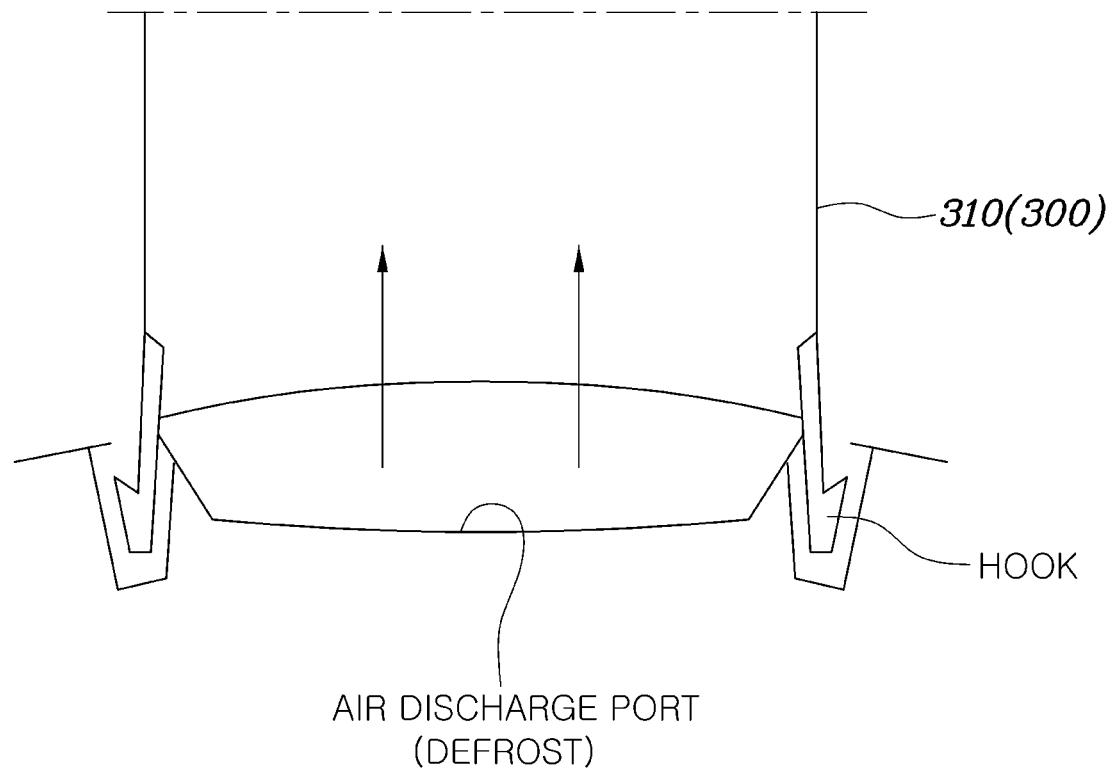
FIG. 2 is a view exemplarily illustrating connection of a duct of the apparatus of sharing air-conditioned air for a mobility vehicle illustrated in FIG. 1.
Figure 3:
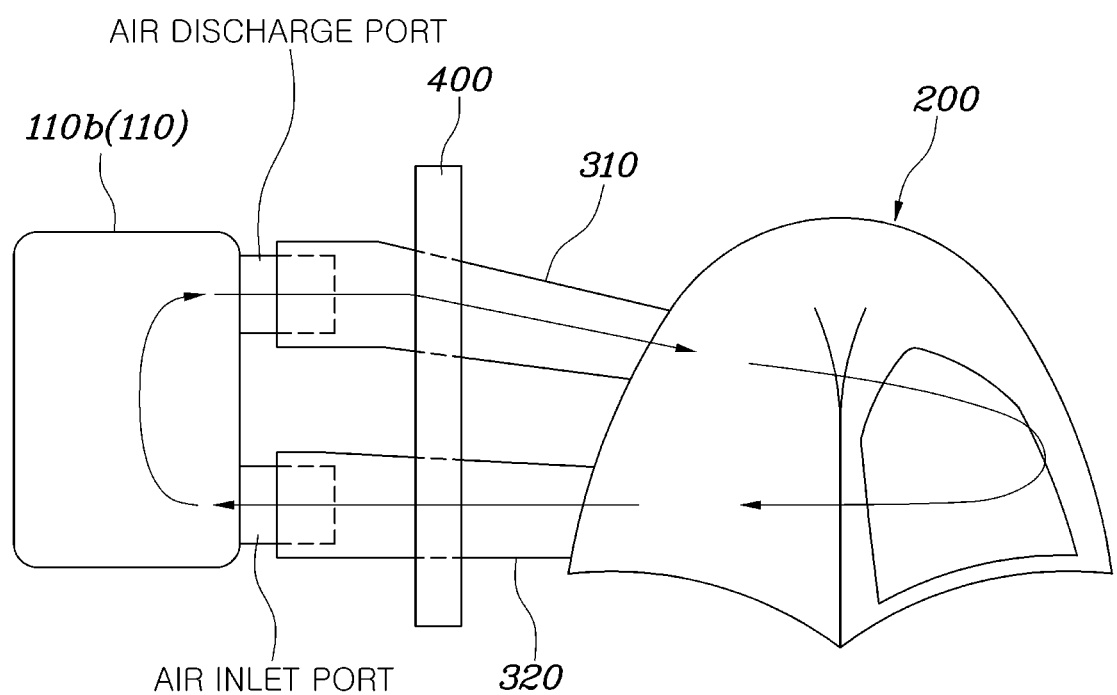
FIG. 3 is a view exemplarily illustrating an apparatus of sharing air-conditioned air for a mobility vehicle according to various exemplary embodiments of the present disclosure.
Figure 4:
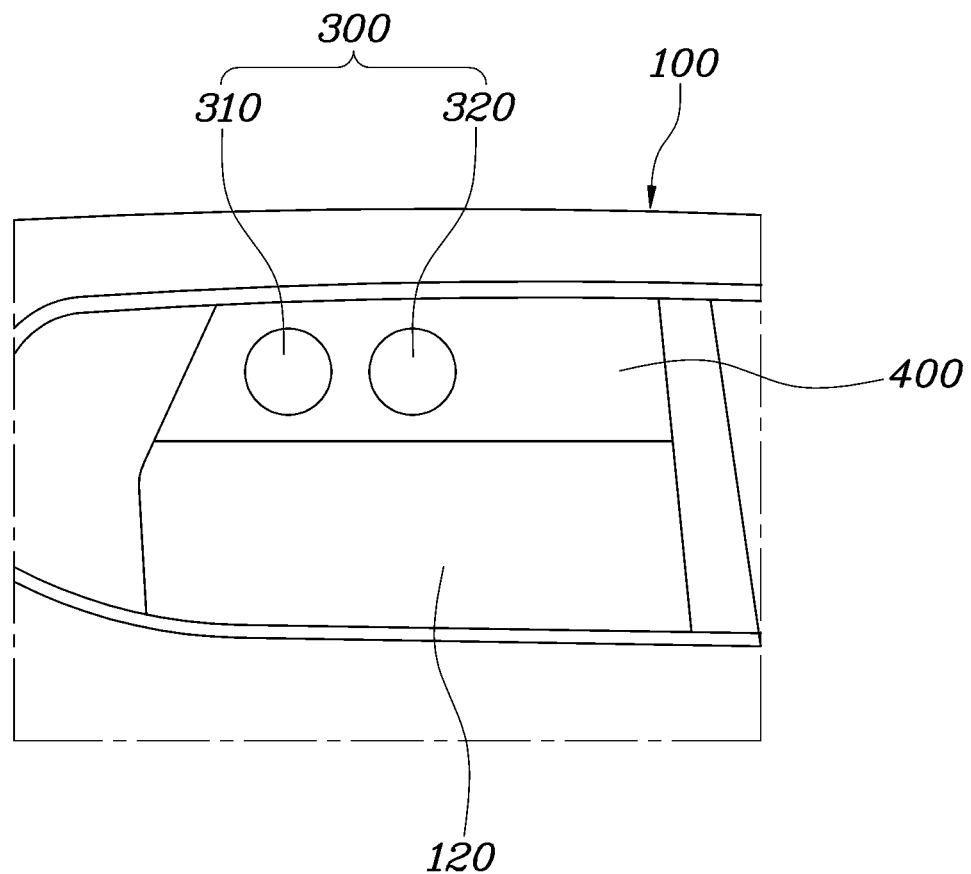
FIG. 4 is a view exemplarily illustrating a duct bracket according to an exemplary embodiment of the present disclosure.
Figure 5:
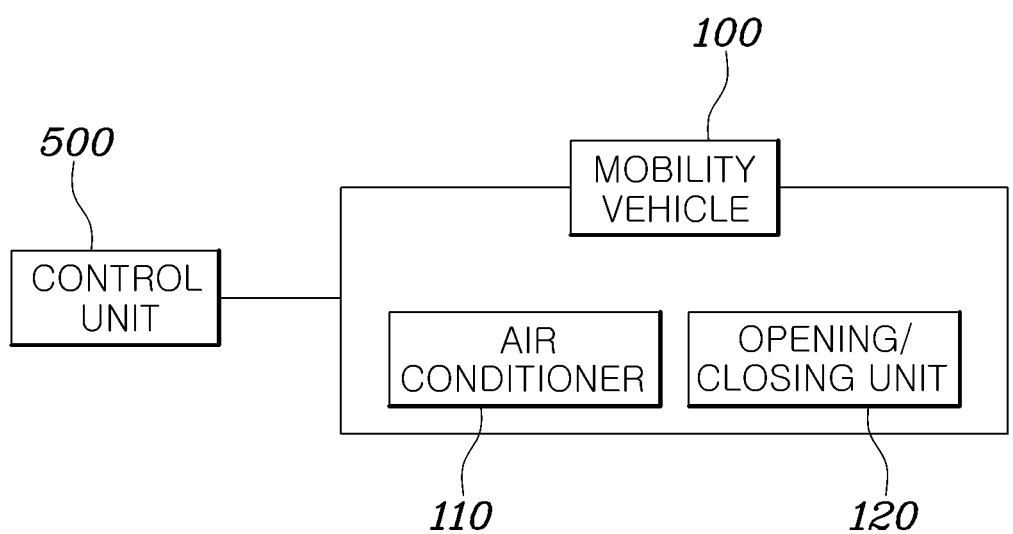
FIG. 5 is a configuration view exemplarily illustrating a system for sharing air-conditioned air for a mobility vehicle.
Figure 6:
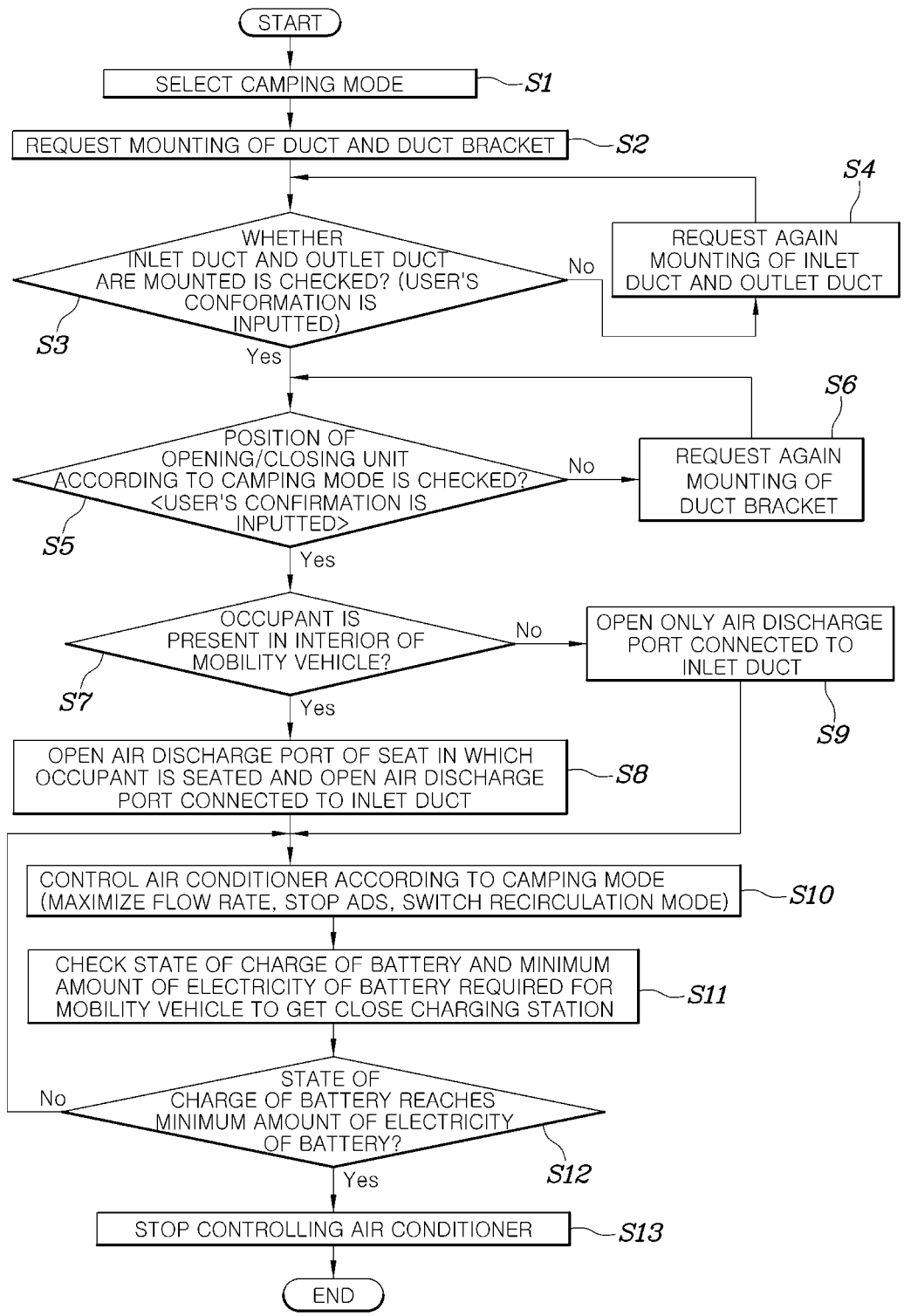
FIG. 6 is a flowchart illustrating a method of controlling sharing air-conditioned air for a mobility vehicle.

FIG. 1 is a view exemplarily illustrating an apparatus of sharing air-conditioned air for a mobility vehicle according to various exemplary embodiments of the present disclosure, FIG. 2 is a view exemplarily illustrating connection of a duct of the apparatus of sharing air-conditioned air for a mobility vehicle illustrated in FIG. 1, FIG. 3 is a view exemplarily illustrating an apparatus of sharing air-conditioned air for a mobility vehicle according to various exemplary embodiments of the present disclosure, FIG. 4 is a view exemplarily illustrating a duct bracket according to an exemplary embodiment of the present disclosure, FIG. 5 is a configuration view exemplarily illustrating a system for sharing air-conditioned air for a mobility vehicle, and FIG. 6 is a flowchart illustrating a method of controlling sharing air-conditioned air for a mobility vehicle.

As illustrated in FIG. 1, an apparatus of sharing air-conditioned air for a mobility vehicle according to an exemplary embodiment of the present disclosure a mobility vehicle 100 including an air conditioner 110 configured to provide air-conditioned air to an interior of the mobility vehicle 100; a tent 200 provided outside the interior of the mobility vehicle 100 and including an internal space; and a duct 300 extending to allow the interior of the mobility vehicle 100 and the internal space of the tent 200 to fluidically communicate with each other, the duct 300 being configured to allow the air-conditioned air provided by the air conditioner 110 to be shared with the internal space of the tent 200.

The mobility vehicle 100 may be operated by electric power of a battery and provide the air-conditioned air to the internal thereof to cool or heat the internal thereof. Therefore, the air conditioner 110 may produce cooling air by operating an electric compressor or produce heating air by operating a heat generator. The air conditioner 110 may provide the cooling air and the heating air and improve air conditioning efficiency by operating a heat pump.

The tent 200 is provided outside the interior of the mobility vehicle 100, provided separately from the mobility vehicle 100, and has the internal space.

The mobility vehicle 100 and the tent 200 are connected to fluidically communicate with each other by the duct 300, and the air-conditioned air provided into the interior of the mobility vehicle 100 flows and circulates through the tent 200 so that a temperature in the internal space of the tent 200 may be adjusted.

That is, the duct 300 may be provided in a form of a hose. The duct 300 extends so that the interior of the mobility vehicle 100 is connected to the internal space of the tent 200 and the air-conditioned air provided through the air conditioner 110 flows into the internal space of the tent 200.

Therefore, a user controls the air conditioner 110 of the mobility vehicle 100 to provide the cooling air or the heating air at the time of adjusting the temperature in the internal space of the tent 200 so that the air-conditioned air may flow to the tent 200 through the duct 300 and the temperature in the internal space of the tent 200 may be adjusted.

In detail, the mobility vehicle 100 has an air intake port through which internal air is introduced, and an air discharge port through which the air-conditioned air provided by the air conditioner 110 is discharged.

Furthermore, the duct 300 includes an inlet duct 310 and an outlet duct 320. The inlet duct 310 is connected to the air discharge port to allow the air-conditioned air to flow to the tent 200, and the outlet duct 320 is connected to the air intake port to allow the air in the tent 200 to circulate to the mobility vehicle 100.

As described above, the duct 300 includes the inlet duct 310 configured to allow the air-conditioned air in the mobility vehicle 100 to flow to the duct 300, and the outlet duct 320 configured to allow the air-conditioned air to circulate back to the mobility vehicle 100 after adjusting the temperature in the tent 200.

Therefore, the air-conditioned air provided by the air conditioner 110 of the mobility vehicle 100 flows to the tent 200 through the air discharge port and the inlet duct 310, adjusts the temperature in the internal space of the tent 200, and then circulates to the air intake port of the mobility vehicle 100 through the outlet duct 320. Therefore, the comfort of the internal space of the tent 200 is improved as the air-conditioned air circulates through the tent 200.

Meanwhile, as illustrated in FIG. 2, one end portion of the inlet duct 310 is detachably connected to the air discharge port of the mobility vehicle 100, and the other end portion of the inlet duct 310 is penetratively connected to the tent 200.

For example, a hook structure may be applied to one end portion of the inlet duct 310 so that one end portion of the inlet duct 310 may be mounted on the air discharge port by hook connection. The inlet duct 310 may be detachably mounted on the air discharge port by various methods such as a magnet and a Velcro fastener in addition to the hook structure. Furthermore, the other end portion of the inlet duct 310 may be penetratively connected to the tent 200. A fitting coupling structure or a catching structure may be applied to the other end portion of the inlet duct 310 so that the other end portion of the inlet duct 310 may be fixedly mounted in the tent 200.

In the instant case, the inlet duct 310 is formed to surround the air discharge port and mounted to cover the air discharge port so that the air-conditioned air may be provided to the inlet duct 310 in a state in which a loss of the air-conditioned air discharged through the air discharge port is minimized. That is, the inlet duct 310 may be larger in size than the air discharge port and cover the air discharge port so that the air-conditioned air discharged through the air discharge port may flow to the inlet duct 310 in the state in which a loss of the air-conditioned air is minimized.

Meanwhile, in a case in which the air-conditioned air is provided through a front air conditioner 110a, the inlet duct 310 is coupled to a defrosting discharge port among air discharge ports. Of course, the inlet duct 310 may be mounted on various air discharge ports provided in the mobility vehicle 100. However, the inlet duct for supplying the air-conditioned air supplied from the front air conditioner 110a is mounted on the defrosting discharge port to ensure a flow rate of the air-conditioned air and make it easy to mount the inlet duct.

Furthermore, when the inlet duct 310 is provided on the air discharge port corresponding to an occupant in a state in which the occupant is present in the mobility vehicle 100, air conditioning efficiency for the occupant may deteriorate. Therefore, the inlet duct 310 is mounted on the defrosting discharge port so that the air conditioning efficiency is also ensured even in the interior of the mobility vehicle 100.

Furthermore, one end portion of the outlet duct 320 is also penetratively connected to the tent 200. A fitting coupling structure or a catching structure may be applied to one end portion of the outlet duct 320 so that the state in which one end portion of the outlet duct 320 is mounted to the tent 200 may be fixed. Furthermore, the air intake port and the other end portion of the outlet duct 320 may be detachably connected by various methods such as a hook connection structure, a magnet, and a Velcro fastener.

Meanwhile, as illustrated in FIG. 3, in a case in which the air-conditioned air is provided through a rear air conditioner 110b, the inlet duct 310 may be connected to an air discharge port connected to the rear air conditioner 110b, and the outlet duct 320 may be connected to an air inlet port connected to the rear air conditioner 110b.

As described above, to use the air-conditioned air supplied from the rear air conditioner 110b, the inlet duct 310 and the outlet duct 320 are respectively connected to the air discharge port and the air inlet port provided in a rear seat so that the air-conditioned air supplied from the rear air conditioner 110b may be transmitted to the tent 200.

Therefore, in the case in which the occupant is present in the interior of the mobility vehicle 100, the air-conditioned air supplied from the front air conditioner 110a may be supplied to the interior of the mobility vehicle 100, and the air-conditioned air supplied from the rear air conditioner 110b may be supplied to the tent 200 through the inlet duct 310 and the outlet duct 320.

As described above, according to an exemplary embodiment of the present disclosure, to provide the air-conditioned air to the tent 200, the air-conditioned air supplied from the front air conditioner 110a or the rear air conditioner 110b may be transmitted to the tent 200 through the inlet duct 310 and the outlet duct 320. Furthermore, the inlet duct 310 and the outlet duct 320 are selectively and respectively connected to the air discharge port and the air intake port depending on whether the front air conditioner 110a or the rear air conditioner 110b is used according to the situations, ensuring the utilization of the air conditioning air.

Meanwhile, the apparatus further includes a duct bracket 400 detachably mounted on the mobility vehicle 100 and configured to fix a position of the duct 300.

As illustrated in FIG. 4, the duct bracket 400 is configured so that the inlet duct 310 and the outlet duct 320, which form the duct 300, penetrate the duct bracket 400. The duct bracket 400 fixes the positions of the inlet duct 310 and the outlet duct 320 by surrounding the inlet duct 310 and the outlet duct 320.

That is, the inlet duct 310 and the outlet duct 320, which form the duct 300, pass through an opening/closing unit 120 including a door glass or a roof of the mobility vehicle 100 to allow the interior of the mobility vehicle 100 and the internal space of the tent 200 to fluidically communicate with each other.

In the instant case, the opening/closing unit 120 may be a door glass or sunroof. That is, the inlet duct 310 and the outlet duct 320 are connected to the interior of the mobility vehicle 100 from the exterior of the mobility vehicle 100. Therefore, the inlet duct 310 and the outlet duct 320 pass through the door glass or sunroof including a relatively small open region except for a door so that the air-conditioned air flows between the interior of the mobility vehicle 100 and the internal space of the tent 200.

Of course, the inlet duct 310 and the outlet duct 320 may pass through the internal and the external through the opened door. However, air conditioning efficiency deteriorates because of heat exchange between the internal and the external. Therefore, the inlet duct 310 and the outlet duct 320 connect the mobility vehicle 100 and the tent 200 through the door glass or sunroof.

Therefore, the duct bracket 400 is mounted on the opening/closing unit 120 including the door glass or the roof of the mobility vehicle 100, and the duct 300 passes through the duct bracket 400 to allow the interior of the mobility vehicle 100 and the internal space of the tent 200 to fluidically communicate with each other.

That is, the duct bracket 400 is mounted on the opening/closing unit 120, and the inlet duct 310 and the outlet duct 320, which form the duct 300, penetrate the duct bracket 400 so that the remaining region, except for the region of the opening/closing unit 120 penetrated by the inlet duct 310 and the outlet duct 320, is closed. Therefore, the interior of the mobility vehicle 100 is sealed, and the air conditioning efficiency in the internal is ensured.

The duct bracket 400 may have holes through which the inlet duct 310 and the outlet duct 320 pass. A sealing body for sealing a portion between the inlet duct 310 and the outlet duct 320 may be further provided at the periphery of the holes.

Furthermore, the duct bracket 400 is detachably mounted on the opening/closing unit 120 so that the duct bracket 400 may be selectively used only in the camping situation in which the air-conditioned air flows between the mobility vehicle 100 and the tent 200. The positions of the inlet duct 310 and the outlet duct 320 are fixed by the duct bracket 400, which prevents damage to the components due to free movements of the inlet duct 310 and the outlet duct 320.

Furthermore, the duct bracket 400 may be formed to match a shape of a portion of the door glass or the roof forming the opening/closing unit 120 and mounted by being pressed against the door glass or the roof when the opening/closing unit 120 is closed.

That is, because the duct bracket 400 is formed to match a portion of the overall shape of the door glass or the roof forming the opening/closing unit 120, the duct bracket 400 blocks the remaining region even though the opening/closing unit 120 is not completely closed when the opening/closing unit 120 is closed.

Furthermore, because the state in which the duct bracket 400 is mounted by being pressed against the door glass or the roof forming the opening/closing unit 120 is maintained at the time of closing the opening/closing unit 120, a separate means for fixing the duct bracket 400 to the opening/closing unit 120 is not required. Furthermore, the duct bracket 400 is formed so that the door glass or the roof forming the opening/closing unit 120 is inserted into a rim portion of the duct bracket 400 so that the duct bracket 400 may be securely mounted on the opening/closing unit 120.

As described above, the apparatus of sharing air-conditioned air for the mobility vehicle 100 according to an exemplary embodiment of the present disclosure allows the mobility vehicle 100 and the tent 200 to share the air-conditioned air through the duct 300 so that the air-conditioned air produced in the mobility vehicle 100 circulates through the duct 300 and the temperature in the internal space of the tent 200 is adjusted. Furthermore, energy efficiency is improved as a loss of the air-conditioned air is minimized at the time of transmitting the air-conditioned air from the mobility vehicle 100 to the tent 200.

Meanwhile, as illustrated in FIGS. 1 and 5, a system for sharing air-conditioned air for the mobility vehicle 100 according to various exemplary embodiments of the present disclosure may include the mobility vehicle 100 including the air conditioner 110 configured to provide the air-conditioned air to the interior of the mobility vehicle 100, the mobility vehicle 100 including the air intake port through which the internal air is introduced, and the air discharge port through which the air-conditioned air provided by the air conditioner 110 is discharged; the tent 200 provided outside the interior of the mobility vehicle 100 and including the internal space; and the duct 300 extending to allow the interior of the mobility vehicle 100 and the internal space of the tent 200 to fluidically communicate with each other and configured to allow the air-conditioned air provided by the air conditioner 110 to be shared with the internal space of the tent 200. The system further includes a control unit 500 configured to control the mobility vehicle 100 including the air conditioner 110, include a camping mode in addition to an air conditioning mode, and control the air conditioner 110 according to the camping mode when the camping mode is selected.

That is, according to an exemplary embodiment of the present disclosure, when the user selects the camping mode in the state in which the mobility vehicle 100 and the tent 200 are connected to fluidically communicate with each other through the duct 300, the air-conditioned air provided by the air conditioner 110 flows to the tent 200 through the duct 300 so that the temperature in the internal space of the tent 200 is adjusted.

In the instant case, when the user selects the camping mode through a mobile phone terminal held by the user or a manipulation unit provided in the mobility vehicle 100, the control unit 500 controls the air conditioner 110 according to the camping mode.

The control according to the selected camping mode may be performed as follows.

When the camping mode is selected, the control unit 500 performs a recirculation mode in which outside air is blocked and internal air is circulated. That is, the control unit 500 performs the recirculation mode when the camping mode is selected so that only the internal air circulates in the interior of the mobility vehicle 100, which improves cooling and heating efficiency.

Furthermore, when the camping mode is selected, the control unit 500 allows the air-conditioned air to flow at a maximum flow rate. That is, when the camping mode is selected, the air-conditioned air discharged from the air discharge port needs to move to the tent 200 through the duct 300. Therefore, a blower is maximally operated to allow the air-conditioned air to smoothly flow to the tent 200 through the duct 300.

Meanwhile, the duct 300 includes the inlet duct 310 and the outlet duct 320. The inlet duct 310 is connected to the air discharge port to allow the air-conditioned air to flow to the tent 200, and the outlet duct 320 is connected to the air intake port to allow the air in the tent 200 to circulate to the mobility vehicle 100.

Therefore, the air-conditioned air provided by the air conditioner 110 of the mobility vehicle 100 flows to the tent 200 through the air discharge port and the inlet duct 310, adjusts the temperature in the internal space of the tent 200, and then circulates to the air intake port of the mobility vehicle 100 through the outlet duct 320. Therefore, the comfort of the internal space of the tent 200 is improved as the air-conditioned air circulates through the tent 200.

In the instant case, when the camping mode is selected, the control unit 500 may perform control to open the air discharge port connected to the inlet duct 310 and close the remaining air discharge ports.

That is, when the camping mode is selected, the air-conditioned air provided by the air conditioner 110 of the mobility vehicle 100 flows to the tent 200 through the inlet duct 310. Therefore, the control unit 500 controls respective doors in the air conditioner 110 to open only the air discharge port connected to the inlet duct 310 and close the remaining air discharge ports.

Therefore, the air-conditioned air is concentrated only in the air discharge port connected to the inlet duct 310 and then discharged so that a flow rate of the air-conditioned air flowing to the tent 200 is ensured, which improves performance in conditioning air in the tent 200.

Meanwhile, the control unit 500 receives information as to whether the occupant is present in the interior of the mobility vehicle 100. When the occupant is present in the interior of the mobility vehicle 100, the control unit 500 performs control to open the air discharge port corresponding to a seat in which the occupant is accommodated.

That is, the control unit 500 may determine whether the occupant is present in the interior of the mobility vehicle 100 based on information obtained from a pressure detector provided in a seat, information obtained from a camera detector provided in the mobility vehicle 100, or information as to whether a seat is folded.

Therefore, when the occupant is present in the interior of the mobility vehicle, the control unit 500 performs control to open the air discharge port corresponding to the seat in which the occupant is accommodated so that the air-conditioned air is also provided to the occupant in the interior of the mobility vehicle.

Therefore, the air discharge port, which is connected to the inlet duct 310, and the air discharge port, which corresponds to the seat in which the occupant is accommodated, are opened when the occupant is present in the internal in the state in which the camping mode is selected so that the air-conditioned air flows to the tent 200 and the occupant in, the interior, allowing the air-conditioned air to ensure the comfort in each of the spaces.

Meanwhile, when the camping mode is selected, the control unit 500 checks, from the user, whether the inlet duct 310 and the outlet duct 320 are mounted. When it is determined, from the user, that the inlet duct 310 and the outlet duct 320 are mounted, the control unit 500 performs control according to the camping mode.

That is, when the camping mode is selected, the control unit 500 requests the user to mount the inlet duct 310 and the outlet duct 320 through the user's mobile phone terminal or a display in the mobility vehicle 100. Thereafter, when the user inputs a command in respect to the completion of the mounting of the duct 300 through the mobile phone terminal or the display in the state in which the inlet duct 310 is mounted on the air discharge port and the outlet duct 320 is mounted on the air intake port, the control unit 500 determines that the inlet duct 310 and the outlet duct 300 are normally mounted, and the control unit 500 performs control according to the camping mode.

As described above, when the camping mode is selected, the control unit 500 completes a preparation process according to the camping mode and then controls the air conditioner 110 according to the camping mode, preventing a malfunction.

Meanwhile, the mobility vehicle 100 further includes the duct bracket 400 detachably mounted on the opening/closing unit 120 including the door glass or roof. The inlet duct 310 and the outlet duct 320 penetrate the duct bracket 400, and the duct bracket 400 fixes the inlet duct 310 and the outlet duct 320.

That is, the duct bracket 400 is mounted on the opening/closing unit 120, and the inlet duct 310 and the outlet duct 320 penetrate the duct bracket 400 so that the remaining region, except for the region of the opening/closing unit 120 penetrated by the inlet duct 310 and the outlet duct 320, is closed.

Furthermore, the duct bracket 400 is detachably mounted on the opening/closing unit 120 so that the duct bracket 400 may be selectively used only in the camping situation in which the air-conditioned air flows between the mobility vehicle 100 and the tent 200. The positions of the inlet duct 310 and the outlet duct 320 are fixed by the duct bracket 400, which prevents damage to the components due to free movements of the inlet duct 310 and the outlet duct 320.

Therefore, when the camping mode is selected, the control unit 500 checks whether the duct bracket 400 is mounted on the opening/closing unit 120. When the duct bracket 400 is mounted on the opening/closing unit 120, the control unit 500 performs control according to the camping mode.

In detail, when an opening amount of the opening/closing unit 120 is at a predetermined level, the control unit 500 determines that the duct bracket 400 is mounted, and the control unit 500 performs control according to the camping mode when it is determined that the duct bracket 400 is mounted.

That is, the duct bracket 400 may be formed to match a shape of a portion of the door glass or the roof forming the opening/closing unit 120 and mounted by being pressed against the door glass or the roof when the opening/closing unit 120 is closed. Therefore, the control unit 500 may check whether the door glass or the roof forming the opening/closing unit 120 is closed at a predetermined level or more to fix the duct bracket 400, determining whether the duct bracket 400 is mounted on the opening/closing unit 120.

Furthermore, when the user inputs the command in respect to the completion of the mounting of the duct bracket 400 through the mobile phone terminal or the display in the state in which the duct bracket 400 is mounted on the opening/closing unit 120, the control unit 500 determines that the duct bracket 400 is normally mounted, and the control unit 500 performs control according to the camping mode.

Meanwhile, when the camping mode is selected, the control unit 500 performs control not to perform a function of removing moisture. That is, the mobility vehicle 100 is provided with a function of removing fog such as an Auto defog system (ADS). However, because the user is in the tent 200 in the camping mode, there is no problem even though the interior of the mobility vehicle 100 fogs up.

An unnecessary loss of electric power occurs when the function of removing moisture is performed in the camping mode as described above, the control unit 500 does not operate the ADS when the camping mode is selected.

Meanwhile, when the camping mode is selected, the control unit 500 receives information in a state of charge (SOC) value of the battery of the mobility vehicle 100 and checks a charging station closest to the current position of the mobility vehicle 100 or the minimum amount of electricity of the battery which is to be consumed while the mobility vehicle 100 gets a preset charging station. When the state of charge of the battery reaches the minimum amount of electricity of the battery, the control unit 500 does not operate the air conditioner 110.

In the instant case, the control unit 500 checks information on the state of charge (SOC) value of the battery and checks the amount of consumed electricity of the battery at the time of controlling the air conditioner 110 according to the camping mode.

Furthermore, the control unit 500 checks the charging station closest to the current position of the mobility vehicle 100 or the minimum amount of electricity of the battery which is to be consumed when the mobility vehicle 100 gets to the preset charging station or a charging station lastly used by the mobility vehicle 100.

Therefore, the control unit 500 prevents the discharge of the battery caused by the consumption of the electric power when the air conditioner 110 operates in the camping mode so that the state of charge of the battery, which enables the mobility vehicle 100 to move to the charging station, is ensured, and the use of the mobility vehicle 100 is stabilized.

Furthermore, when the state of charge of the battery reaches the minimum amount of electricity of the battery, the control unit 500 does not operate the air conditioner 110 and stops operations of other devices, which consume electric power, in addition to the air conditioner 110, facilitating the mobility vehicle 100 to stably move to the charging station and be charged.

Therefore, the control unit 500 may implement the camping mode according to control steps S1, S2, S3, S4, S5, S6, S7, S8, S9, S10, S11, S12 and S13 in the flowchart illustrated in FIG. 6.

The apparatus and system for sharing air-conditioned air for the mobility vehicle 100 structured as described above allow the mobility vehicle 100 and the tent 200 to share the air-conditioned air through the duct 300 so that the air-conditioned air produced in the mobility vehicle 100 circulates through the duct 300 and the temperature in the internal space of the tent 200 is adjusted.

Furthermore, energy efficiency is improved as a loss of the air-conditioned air is minimized at the time of transmitting the air-conditioned air from the mobility vehicle 100 to the tent 200.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus comprising: a mobility vehicle including an air conditioner configured to provide air-conditioned air, the apparatus further comprising:
    the mobility vehicle including the air conditioner configured to provide the air-conditioned air to an interior of the mobility vehicle;
    a shelter provided outside the interior of the mobility vehicle and including an internal space in the shelter; and
    at least one duct configured for extending to allow the interior of the mobility vehicle and the internal space of the shelter to fluidically communicate with each other, the at least one duct being configured to allow the air-conditioned air provided by the air conditioner to be shared with the internal space of the shelter.

2. The apparatus of claim 1,
    wherein the air conditioner includes:
    an air intake port through which internal air of the mobility vehicle is introduced; and
    at least one air discharge port through which the air-conditioned air provided by the air conditioner is discharged,
    wherein the at least one duct comprises an inlet duct and an outlet duct, and
    wherein the inlet duct is connected to the at least one air discharge port to allow the air-conditioned air to flow to the shelter, and the outlet duct is connected to the air intake port to allow air in the shelter to circulate through the mobility vehicle.

3. The apparatus of claim 2,
    wherein a first end portion of the inlet duct is detachably connected to the at least one air discharge port of the mobility vehicle, and a second end portion of the inlet duct is penetratively connected to the shelter, and
    wherein a first end portion of the outlet duct is penetratively connected to the shelter, and a second end portion of the outlet duct is detachably connected to the air intake port of the mobility vehicle.

4. The apparatus of claim 2, wherein the inlet duct is formed to surround the at least one air discharge port and mounted to cover the at least one air discharge port.

5. The apparatus of claim 2,
    wherein the at least one air discharge port includes a plurality of air discharge ports, and
    wherein the air conditioner includes a front air conditioner, and
    wherein when the air-conditioned air is provided through the front air conditioner, the inlet duct is coupled to a defrosting discharge port among the plurality of air discharge ports.

6. The apparatus of claim 2,
    wherein the air conditioner includes a rear air conditioner, and
    wherein when the air-conditioned air is provided through the rear air conditioner, the inlet duct is connected to the at least one air discharge port connected to the rear air conditioner, and the outlet duct is connected to the air inlet port connected to the rear air conditioner.

7. The apparatus of claim 1, further including:
    a duct bracket detachably mounted on the mobility vehicle and configured to fix a position of the at least one duct.

8. The apparatus of claim 7, wherein the duct bracket is detachably mounted on an opening/closing unit including a door glass or a roof of the mobility vehicle, and the at least one duct passes through the duct bracket to allow the interior of the mobility vehicle and the internal space of the shelter to fluidically communicate with each other through the at least one duct.

9. The apparatus of claim 8, wherein the duct bracket is formed to match a shape of a portion of the door glass or the roof forming the opening/closing unit, and the duct bracket is mounted by being pressed against the door glass or the roof when the opening/closing unit is closed.

10. A system comprising: a mobility vehicle including an air conditioner configured to provide air-conditioned air, the system further including:
    the mobility vehicle including the air conditioner configured to provide the air-conditioned air to an interior of the mobility vehicle, the air conditioner including an air intake port through which internal air of the mobility vehicle is introduced, and an air discharge port through which the air-conditioned air provided by the air conditioner is discharged;
    a shelter provided outside the interior of the mobility vehicle and including an internal space in the shelter;
    at least one duct configured for extending to allow the interior of the mobility vehicle and the internal space of the shelter to fluidically communicate with each other, the at least one duct being configured to allow the air-conditioned air provided by the air conditioner to be shared with the internal space of the shelter; and
    a control unit configured to control the mobility vehicle including the air conditioner, under a camping mode or an air conditioning mode, and to control the air conditioner according to the camping mode when the camping mode is selected.

11. The system of claim 10, wherein when the camping mode is selected, the control unit is configured to perform a recirculation mode in which outside air is blocked out of the mobility vehicle and the internal air circulates in the mobility vehicle.

12. The system of claim 10, wherein when the camping mode is selected, the control unit is configured to control the air conditioner to blow the air-conditioned air at a maximum flow rate.

13. The system of claim 10,
wherein the at least one duct comprises an inlet duct and an outlet duct, the inlet duct is connected to the air discharge port to allow the air-conditioned air to flow to the shelter, and the outlet duct is connected to the air intake port to allow air in the shelter to circulate through the mobility vehicle, and
wherein when the camping mode is selected, the control unit is configured to perform control of the air conditioner to open the air discharge port connected to the inlet duct and close a remaining air discharge port of the air conditioner.

14. The system of claim 13,
wherein the control unit is configured to receive information as to whether an occupant is present in the interior of the mobility vehicle, and
wherein when the control unit concludes that the occupant is present in the interior of the mobility vehicle, the control unit is configured to perform control of the air conditioner to open the air discharge port corresponding to a seat in which the occupant is accommodated.

15. The system of claim 13,
wherein when the camping mode is selected, the control unit is configured to check whether the inlet duct and the outlet duct are mounted, and
wherein when the control unit concludes that the inlet duct and the outlet duct are mounted, the control unit is configured to perform control of the air conditioner according to the camping mode.

16. The system of claim 15,
wherein, when the control unit receives an input from a user related to completion of the mounting the inlet duct on the air discharge port and the outlet duct on the air intake port, the control unit concludes that the inlet duct and the outlet duct are mounted.

17. The system of claim 13, wherein the mobility vehicle further includes a duct bracket detachably mounted on an opening/closing unit including a door glass or a roof of the mobility vehicle, the duct bracket is configured to fix the inlet duct and the outlet duct as the inlet duct and the outlet duct penetrate the duct bracket, and the control unit is configured to check whether the duct bracket is mounted on the opening/closing unit when the camping mode is selected.

18. The system of claim 17,
wherein when an opening amount of the opening/closing unit is at a predetermined level, the control unit is configured to determine that the duct bracket is mounted, and
wherein when the control unit determines that the duct bracket is mounted, the control unit is configured to perform control of the air conditioner according to the camping mode.

19. The system of claim 10, wherein when the camping mode is selected, the control unit is configured to perform control of the air conditioner not to perform a function of removing moisture.

20. The system of claim 10,
wherein when the camping mode is selected, the control unit is configured to receive information in a state of charge (SOC) value of a battery of the mobility vehicle and configured to check a charging station closest to a current position of the mobility vehicle or a minimum amount of electricity of the battery which is to be consumed while the mobility vehicle gets to a preset charging station, and
wherein when the SOC value of the battery reaches the minimum amount of electricity of the battery, the control unit is configured not to operate the air conditioner.

* * * * *